United States Patent
Itou et al.

(10) Patent No.: US 10,054,832 B2
(45) Date of Patent: Aug. 21, 2018

(54) LIQUID CRYSTAL DISPLAY DEVICE

(71) Applicant: Japan Display Inc., Tokyo (JP)

(72) Inventors: Osamu Itou, Tokyo (JP); Kenji Nakao, Tokyo (JP); Toshimasa Ishigaki, Tokyo (JP); Masahiro Kosuge, Tokyo (JP)

(73) Assignee: Japan Display Inc., Tokyo (JP)

( * ) Notice: Subject to any disclaimer, the term of this patent is extended or adjusted under 35 U.S.C. 154(b) by 129 days.

(21) Appl. No.: 14/923,915

(22) Filed: Oct. 27, 2015

(65) Prior Publication Data

US 2016/0116797 A1    Apr. 28, 2016

(30) Foreign Application Priority Data

Oct. 27, 2014  (JP) ................................ 2014-218452

(51) Int. Cl.
*G02F 1/1362* (2006.01)
*G02F 1/1343* (2006.01)

(52) U.S. Cl.
CPC .. *G02F 1/136227* (2013.01); *G02F 1/134363* (2013.01); *G02F 2001/134372* (2013.01); *G02F 2001/136222* (2013.01)

(58) Field of Classification Search
CPC ......... G02F 1/136227; G02F 1/134363; G02F 2001/136222; G02F 2001/134372
USPC .................................................. 349/43, 138
See application file for complete search history.

(56) References Cited

U.S. PATENT DOCUMENTS

| | | | |
|---|---|---|---|
| 2010/0001276 A1* | 1/2010 | Kim .................. | G02F 1/136227 257/59 |
| 2012/0105778 A1* | 5/2012 | Fujiyoshi .......... | G02F 1/134363 349/106 |
| 2014/0002764 A1* | 1/2014 | Seo ....................... | G02F 1/1343 349/43 |

FOREIGN PATENT DOCUMENTS

| | | |
|---|---|---|
| JP | 2002-40485 A | 2/2002 |
| JP | 2002-350886 A | 12/2002 |
| JP | 2004-302297 A | 10/2004 |
| JP | 2010-160254 A | 7/2010 |
| JP | 2012-93665 A | 5/2012 |
| JP | 2013-186148 A | 9/2013 |

OTHER PUBLICATIONS

Japanese Office Action dated Apr. 24, 2018 for corresponding Japanese Application No. 2014-218452.

* cited by examiner

*Primary Examiner* — Angela Davison
(74) *Attorney, Agent, or Firm* — Typha IP LLC

(57) ABSTRACT

Disclosed is a liquid crystal display device including an active element substrate having an active element; a first layer provided on the active element and having a first hole formed therein, the first layer being one of a first insulating layer and a color filter; a second layer provided on the first layer and having a second hole formed therein, the second layer being the other of the first insulating layer and the color filter; a common electrode provided on the second layer; a second insulating layer having a plate-like portion provided on the common electrode and a first contact portion protruded downward; and a pixel electrode having a second contact portion protruded downward. The first contact portion is provided inside the second hole, and the second contact portion is provided inside the first hole and inside the second hole and electrically connected to the active element.

12 Claims, 19 Drawing Sheets

(a)

(b)

(c)

(d)

(a)

(b)

(c)

(d)

LIQUID CRYSTAL DISPLAY DEVICE

CLAIM OF PRIORITY

The present application claims priority from Japanese Patent Application JP 2014-218452 filed on Oct. 27, 2014, the content of which is hereby incorporated by reference into this application.

BACKGROUND OF THE INVENTION (1) Field of the Invention

The present invention relates to liquid crystal display devices and, more particularly, to a liquid crystal display device in which a color filter and active elements are placed on one identical substrate side.

(2) Description of the Related Art

For liquid crystal display devices in which a color filter and a black matrix are provided on an upper substrate while interconnect lines and active elements are provided on a lower substrate with liquid crystals interposed therebetween, there is a great difficulty in achieving positional alignment, more often incurring color mixtures and decreases in the numerical aperture.

In order to solve such problems, there has been used a COA (Color filter On Array) method in which a color filter and active elements are formed on one identical substrate.

PTL 1 (JP 2002-350886 A) describes a display device in which in a one-side substrate, a color filter is provided on a protective film for active elements, and contact holes are formed in the protective film for the color filter and the active elements so as to allow one pixel electrode and another pixel electrode of the active elements to be connected to each other.

SUMMARY OF THE INVENTION

However, since the color filter contains chargeable impurities, their diffusion into the liquid crystal layer has to be prevented. In this regard, in particular, vicinities of the contact holes are thinned in layer thickness, causing a problem that the color filter is more likely to be eluted.

The present invention provides a liquid crystal display device comprising: an active element substrate, a counter substrate opposed from above to the active element substrate, and a liquid crystal layer provided between the active element substrate and the counter substrate, wherein the active element substrate includes: an active element; a first layer provided on the active element and having a first hole formed therein, the first layer being one of a first insulating layer and a color filter; a second layer provided on the first layer and having a second hole formed therein, the second layer being the other of the first insulating layer and the color filter; a common electrode provided on the second layer; a second insulating layer having a plate-like portion provided on the common electrode and a first contact portion protruded downward; and a pixel electrode having a plate-like portion provided on the second insulating layer and a second contact portion protruded downward, wherein the first contact portion is provided inside the second hole, and the second contact portion is provided inside the first hole and inside the second hole and electrically connected to the active element.

In the liquid crystal display device according to one aspect of the invention, with a thickness of the color filter assumed to be 1, a thickness of the first insulating layer is within a range of 0.33 to 2.

In the liquid crystal display device according to one aspect of the invention, the first contact portion is provided inside the first hole.

In the liquid crystal display device according to one aspect of the invention, the second layer includes a third contact portion protruded inward of the first hole.

In the liquid crystal display device according to one aspect of the invention, the first layer is the color filter and the second layer is the first insulating layer.

In the liquid crystal display device according to one aspect of the invention, the first layer is the first insulating layer and the second layer is the color filter.

In the liquid crystal display device according to one aspect of the invention, a first spacer shaped along one of a scan signal line and an image signal line is formed in the second layer, and a second spacer shaped along the other of the scan signal line and the image signal line is formed in the counter substrate.

According to this invention, since the first contact portion of the second insulating layer is provided inside the second hole, the color filter can be prevented from being eluted into the liquid crystal layer.

DETAILED DESCRIPTION OF THE PREFERRED EMBODIMENTS

Embodiment 1

Figure 1:
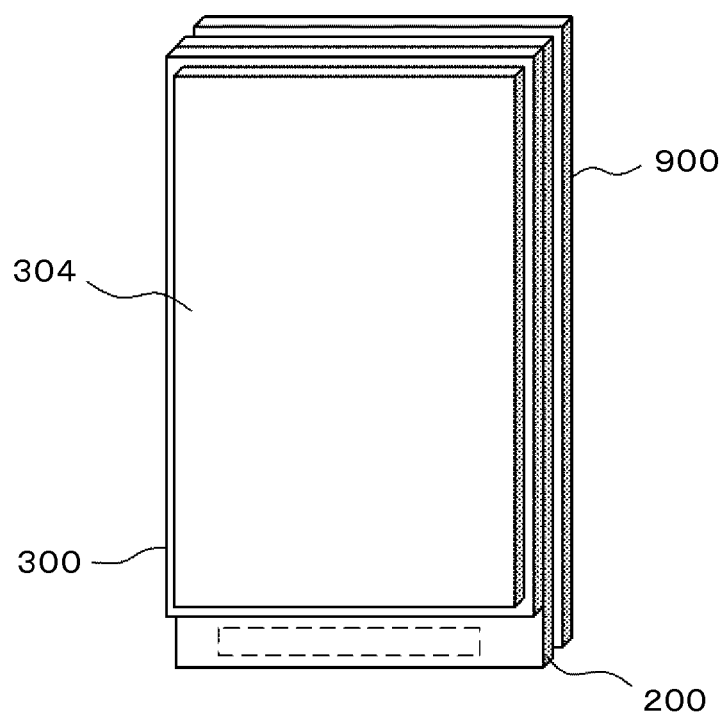
FIG. 1 is a perspective view of a liquid crystal display device in Embodiment 1.

Embodiment 1 of the present invention will be described. FIG. 1 is a perspective view of a liquid crystal display device 100 in Embodiment 1. The liquid crystal display device 100 includes an active element substrate 200, a counter substrate 300, and a backlight unit 900.

The backlight unit 900, having a light emitting part such as an LED (Light Emitting Diode), emits light so that the light is transmitted from outside of the active element substrate 200 through the active element substrate 200 and the counter substrate 300.

Figure 2:
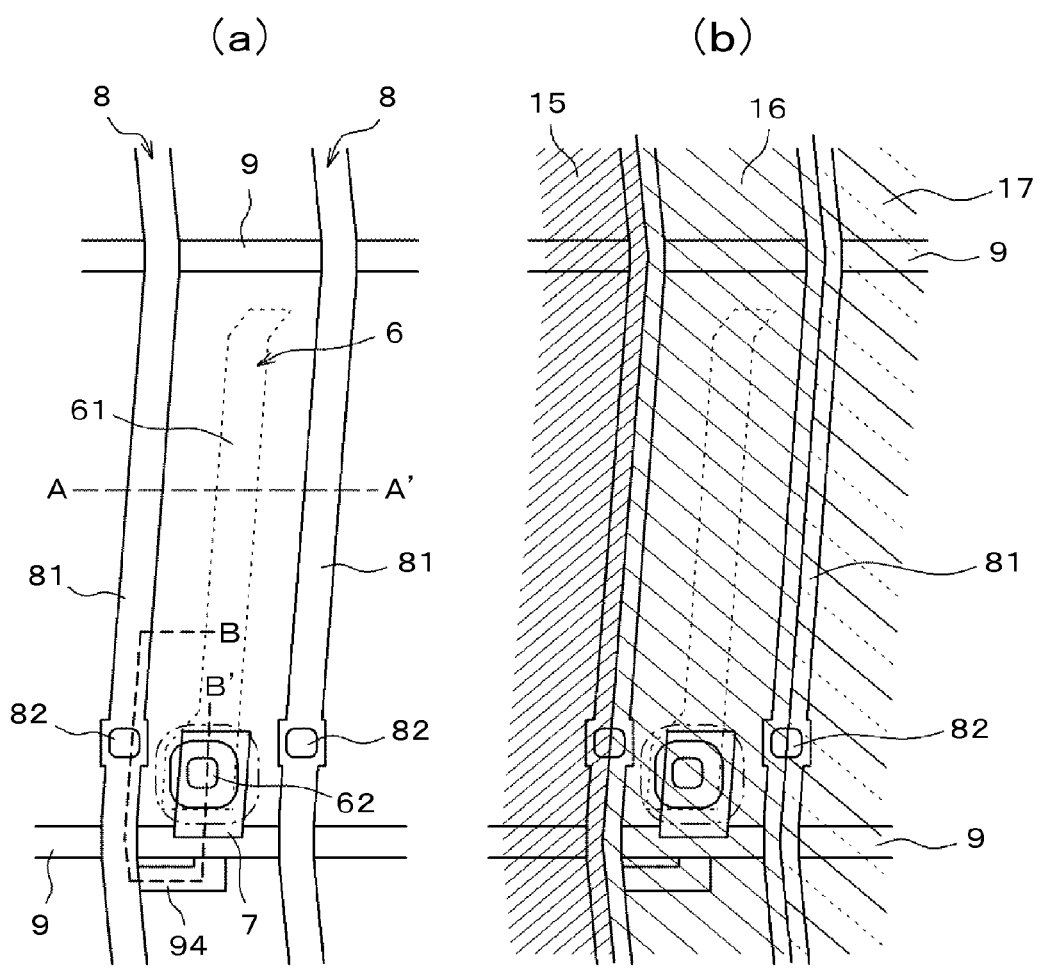
FIG. 2 is a plan view of an active element substrate in Embodiment 1.
Figure 3:
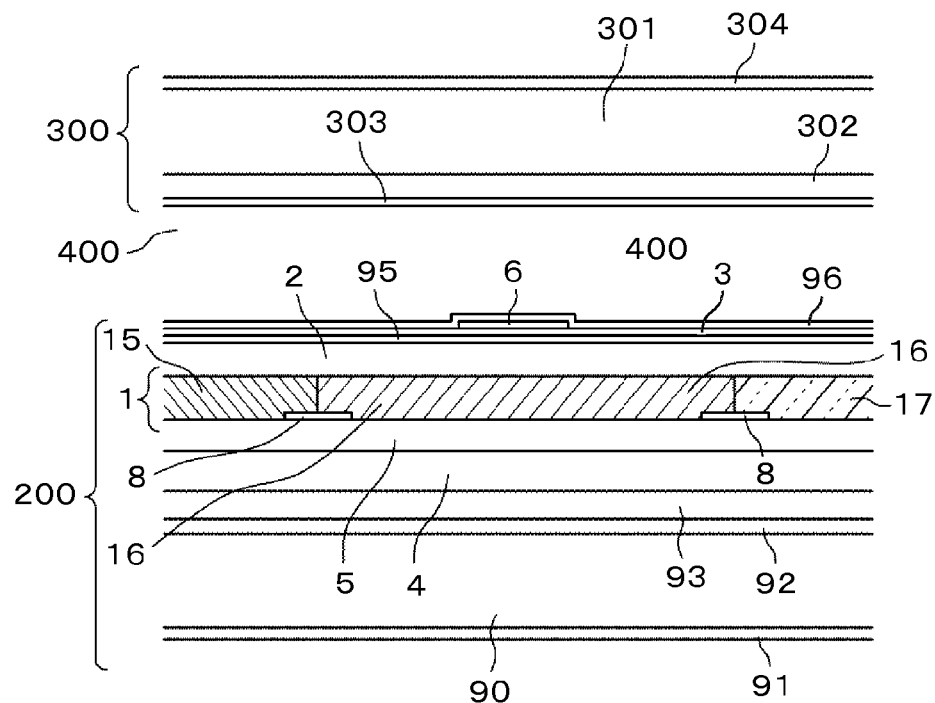
FIG. 3 is a sectional view of the liquid crystal display device in Embodiment 1.
Figure 4:
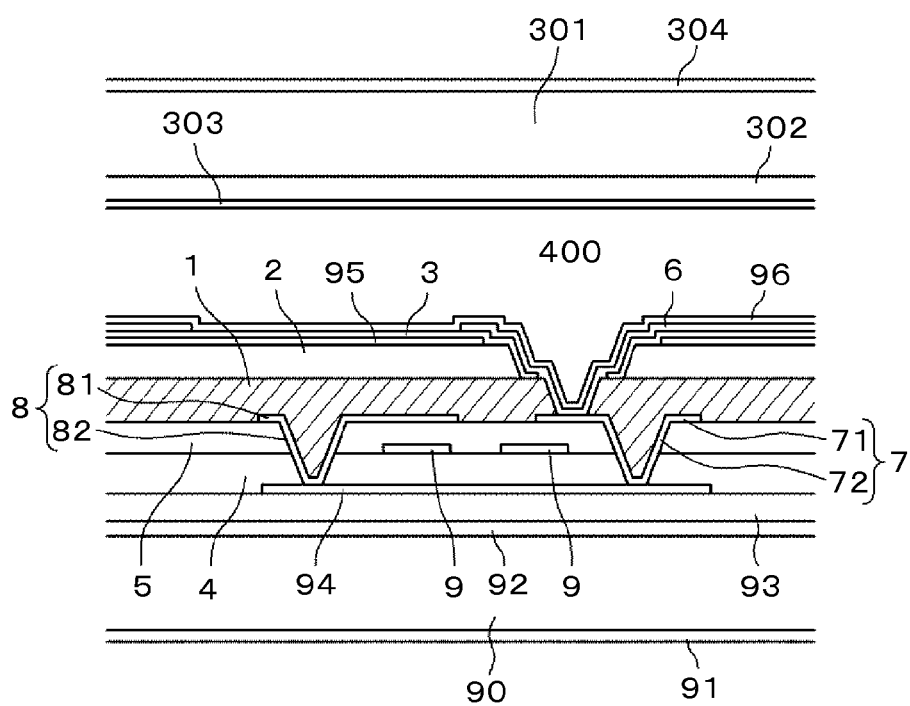
FIG. 4 is a sectional view of the liquid crystal display device in Embodiment 1.

FIG. 2 is a plan view of the active element substrate 200 in Embodiment 1. FIG. 3 is a sectional view of the liquid crystal display device 100 in Embodiment 1. FIG. 4 is a sectional view of the liquid crystal display device 100 in Embodiment 1. FIG. 2(a) and FIG. 2(b) are both plan views of the active element substrate 200, where FIG. 2(b), in particular, schematically shows a placement of a color filter 1. FIG. 3 and FIG. 4 are sectional views taken along line A-A' and line B-B', respectively, in FIG. 2(a).

The liquid crystal display device 100 includes the active element substrate 200, the counter substrate 300 opposed from above to the active element substrate 200, and a liquid crystal layer 400 provided between the active element substrate 200 and the counter substrate 300.

In individual embodiments, it is assumed that a direction from the counter substrate 300 toward the active element substrate 200 is downward while a direction from the active element substrate 200 toward the counter substrate 300 is upward. In addition, in FIG. 3, the backlight unit 900 is provided downward of the active element substrate 200.

The active element substrate 200 includes the color filter 1 as a first layer, a first insulating layer 2 as a second layer, a second insulating layer 3, an insulating layer 4, an insulating layer 5, a pixel electrode 6 as a second electrode, a relay electrode 7, an image signal line 8, a scan signal line 9, a transparent substrate 90, a first polarizing plate 91, an undercoat film 92, an undercoat film 93, a semiconductor layer 94, a common electrode 95 as a first electrode, and a first orientation film 96. Further, a hole as a first hole is formed in the color filter 1 as the first layer. Also, a hole as a second hole is formed in the first insulating layer 2 as the second layer.

The transparent substrate 90 is a flat plate. The transparent substrate 90 is formed of glass, but may be of, for example, plastics or the like. The first polarizing plate 91 is provided in lower portion of the transparent substrate 90.

The undercoat film 92 is provided on the transparent substrate 90. The undercoat film 92 is fabricated from an insulator substance such as silicon nitride.

The undercoat film 93 is provided on the undercoat film 92. The undercoat film 93 is formed from an insulator substance such as silicon oxide. The undercoat film 92 and the undercoat film 93 prevent alkaline components such as sodium ions from being eluted from the transparent substrate 90.

The semiconductor layer 94 is winding strip shaped as in a plan view. The semiconductor layer 94 is provided on part of the undercoat film 93. The semiconductor layer 94 is formed from polysilicon. Instead, the semiconductor layer 94 may be formed, for example, from amorphous silicon or from an oxide semiconductor containing indium, gallium, zinc or the like.

The insulating layer 4 is flat plate shaped. The insulating layer 4 is provided on part of the undercoat film 93 where no semiconductor layer 94 is provided as well as on the semiconductor layer 94. The insulating layer 4 is fabricated from silicon nitride as an example. In the insulating layer 4, two holes are formed per sub-pixel. The holes formed in the insulating layer 4 extend vertically through on portions of the semiconductor layer 94 so as to be formed into a downwardly tapered shape.

The scan signal line 9 is strip shaped as in a plan view. The scan signal line 9 is provided at borders between individual sub-pixels on the insulating layer 4. The individual scan signal lines 9 are parallel to one another. Also, the scan signal lines 9 may be linear shaped or partly bent shaped.

The scan signal lines 9, which are part of later-described active elements of individual pixels, control turn-on and -off of the active elements. Each scan signal line 9 is connected to a scan circuit provided in the active element substrate 200 so as to lead a scan signal inputted from the scan circuit. The scan signal lines 9 receive inputs of a gate high voltage, which is higher than a later-described voltage of the common electrode 95, as well as a gate low voltage, which is lower than the voltage of the common electrode 95.

The insulating layer 5 is flat plate shaped. The insulating layer 5 is provided on part of the insulating layer 4 where no scan signal lines 9 are provided as well as on the scan signal lines 9. The insulating layer 5 is fabricated from silicon nitride as an example.

Also in the insulating layer 5, two holes each extending through vertically and formed into a downwardly tapered shape are formed per sub-pixel. The two holes formed in the insulating layer 5 are formed on upper sides of the two holes formed in the insulating layer 4, respectively. The holes formed in the insulating layer 5 extend vertically through on portions of the semiconductor layer 94 so as to be formed into a downwardly tapered shape. The two holes in the insulating layer 5 may have a lower-end shape similar to an upper-end shape of the two holes formed in the insulating layer 4.

The relay electrode 7 has a flat plate portion 71 and a contact portion 72. The flat plate portion 71 is provided on the insulating layer 5. The flat plate portion 71 is formed into a plate shape which is smaller than a distance between the scan signal lines 9 extending along the borders of the sub-pixels and smaller than a distance between the image signal lines 8, and moreover which is a rectangular shape as in a plan view as an example. The relay electrode 7 is made from metal.

Also, the contact portion 72 is provided at a nearby center of the flat plate portion 71 in adjacency to the flat plate portion 71. The contact portion 72 is, for example, conical shaped or circular truncated conical shaped so as to be downwardly projective. The contact portion 72, having the color filter 1 filled inside thereof, is formed into a downwardly tapered shape. The contact portion 72 has a lateral face provided along the holes of the insulating layer 5 and the holes of the insulating layer 4, and a lower end of the contact portion 72 is in contact with an upper surface of the semiconductor layer 94.

The image signal line 8 is connected to a later-described active element of each pixel. With the active element in the on state, applying an image signal thereto causes a voltage to be applied to the later-described liquid crystal layer 400. The image signal line 8 is connected to an image signal circuit provided in the active element substrate 200. The image signal line 8 leads an image signal inputted from the image signal circuit. The image signal line 8 is made from metal.

The image signal line 8 has a strip-like portion 81 and a contact portion 82. The strip-like portion 81 is provided on the insulating layer 5. The strip-like portion 81 is provided so as to extend in a direction normal to the scan signal lines 9 as in a plan view. The strip-like portion 81 is formed into a generally linear shape having a linear portion and a bent portion which is bent at a place of intersection with the scan signal lines 9 as in a plan view. Bent portions neighboring each other in a direction along the scan signal lines 9 are bent in one identical direction. Meanwhile, bent portions neighboring each other in a direction normal to the scan signal lines 9 are bent in mutually opposite directions. In addition, the scan signal lines 9 may be formed each into a linear shape normal to the image signal line 8. The scan signal lines 9 are made from metal.

Also, the contact portion 82 is provided at a place in the strip-like portion 81 near the relay electrode 7. The contact portion 82 is, for example, conical shaped or circular truncated conical shaped so as to be downwardly projective. The contact portion 82, having the color filter 1 filled inside thereof, is formed into a downwardly tapered shape. The contact portion 82 has a lateral face provided along the holes of the insulating layer 5 and the holes of the insulating layer 4, and a lower end of the contact portion 82 is in contact with the upper surface of the semiconductor layer 94.

As described above, the flat plate portion 71 of the relay electrode 7 and the strip-like portion 81 of the image signal line 8 are provided in one identical layer, where the contact portion 72 of the relay electrode 7 and the contact portion 82 of the image signal line 8 are in contact commonly with the semiconductor layer 94.

The color filter 1 is provided on the relay electrode 7, on the image signal line 8, and on portions of the insulating layer 5 where neither the relay electrode 7 nor the image signal line 8 is provided. The color filter 1 is made from an insulator which is a negative-type organic photoresist containing pigment particles. The color filter 1 has a thickness of, for example, 1 to 3 μm.

The color filter 1 includes a red color filter 15, a green color filter 16 and a blue color filter 17. One of the red color filter 15, the green color filter 16 and the blue color filter 17, whichever it is, is provided per sub-pixel, so that the respective colors are juxtaposed to one another so as to be periodically repeated in a direction along the scan signal lines 9.

One pixel includes sub-pixels having one red color filter 15, one green color filter 16 and one blue color filter 17, respectively. Also, pixels are juxtaposed to one another in a direction along the image signal lines 8 and the scan signal lines 9. The image signal lines 8 are provided along respective borders between the red color filter 15, the green color filter 16 and the blue color filter 17.

The red color filter 15, the green color filter 16 and the blue color filter 17 are formed, for example, into a rectangular shape of the same size, but their size and shape are not limited to that one. In addition, the color filter 1 may be a filter of other colors. The color filter 1 is provided also inside the contact portion 72 and the contact portion 82.

Further, a hole is formed in the color filter 1. The hole of the color filter 1 is formed above the flat plate portion 71. The hole of the color filter 1 extends through vertically so as to be formed into a downwardly tapered shape. The hole of the color filter 1 has, for example, an upper end formed into an about 4 μm-dia. circular shape and a lower end formed into an about 2 μm-dia. circular shape.

The first insulating layer 2 is provided on the color filter 1. The first insulating layer 2 is made, for example, from a positive-type photoresist and from organic high polymer. The first insulating layer 2 has a thickness of, for example, 1 to 2 μm. In the first insulating layer 2, a hole is formed on an upper side of the hole of the color filter 1. The hole of the first insulating layer 2 extends through vertically so as to be formed into a downwardly tapered shape. The hole of the first insulating layer 2 has, for example, an upper end formed into an about 8 μm-dia. circular shape and a lower end formed into an about 6 μm-dia. circular shape.

Figure 5:
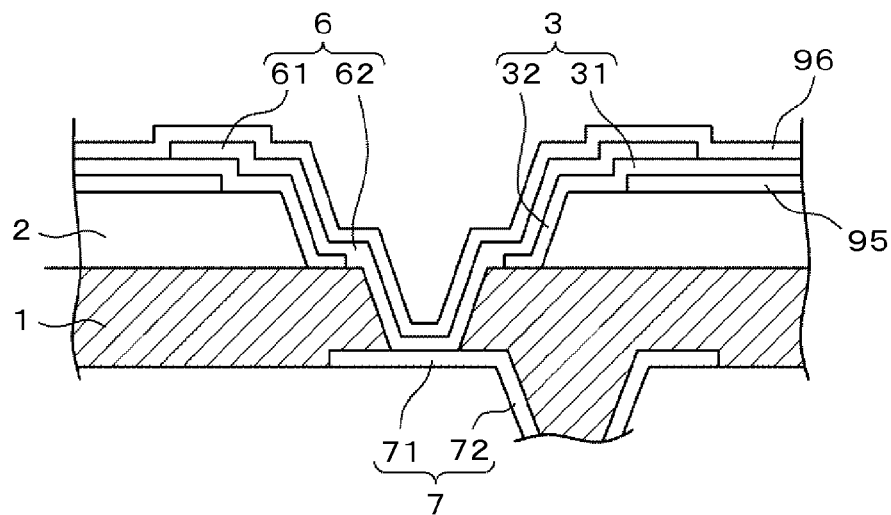
FIG. 5 is a sectional view of the liquid crystal display device in Embodiment 1.

FIG. 5 is a sectional view of the liquid crystal display device 100 in Embodiment 1. FIG. 5 is a partly enlarged view of FIG. 4. As shown in the figure, the hole of the first insulating layer 2 is larger than the hole of the color filter 1, and the hole of the color filter 1 and the hole of the first insulating layer 2 are generally concentric with each other as in a plan view. Accordingly, in circumferential edge portion of the hole of the color filter 1, the first insulating layer 2 is not provided on the upper side. The circumferential edge portion of the hole of the color filter 1 and the circumferential edge portion of the hole of the first insulating layer 2 form a step gap.

In this connection, the color filter 1 transmits only light of particular colors. Also, the color filter 1 may be, in some cases, of the negative type. In this case, it is difficult to make the hole formed into a desired shape. Therefore, it is required to make the color filter 1 smaller in thickness for the purpose of machining the hole of the color filter 1 into a desired shape.

Meanwhile, with a smaller or nearer distance between the image signal line 8 and the common electrode 95, it follows that the image signal line 8, the common electrode 95, as well as the color filter 1 and the first insulating layer 2 that are insulators provided therebetween, function as a capacitor to accumulate electric charge that may cause noise. Therefore, it is required that the image signal line 8 and the common electrode 95 be separate apart from each other with a certain distance or more.

When different color filters 1 are overlapped with each other at a place near their border, the overlapped portion becomes protruded. On the other hand, when the first orientation film 96 has become protruded, using the rubbing method for orientation process may cause orientation faults in vicinities of the protruded portion. Providing the first insulating layer 2 on the upper side of the protruded portion of the color filter 1 with a thickness smaller than in the other portions allows the upper surface to be flattened, so that the above-described problem is solved. Therefore, the first insulating layer 2 is required to have a thickness of a certain level for the flattening of the upper layer.

In order to satisfy the above-described three requirements, the thicknesses of the color filter 1 and the first insulating layer 2 are so set that with the thickness of the color filter 1 assumed to be 1, the thickness of the first insulating layer 2 is within a range of 0.33 to 2. Desirably, particularly in downward regions of the common electrode 95, the thickness ratio of the color filter 1 to the first insulating layer 2 is as defined above. Also, in upward regions of the relay electrode 7 or the image signal line 8, more desirably, the thickness ratio of the color filter 1 to the first insulating layer 2 is as defined above. In this case, desirably, the relay electrode 7 and the image signal line 8 are in direct contact with the color filter 1 in a vertical direction. Desirably, the color filter 1 and the first insulating layer 2 are in direct contact with each other. Desirably, the first insulating layer 2 and the common electrode 95 are in direct contact with each other. More desirably, the thicknesses of the color filter 1 and the first insulating layer 2 are so set that with the thickness of the color filter 1 assumed to be 1, the thickness of the first insulating layer 2 is within a range of 0.4 to 1.5.

The common electrode 95 is provided on the first insulating layer 2. The common electrode 95 is formed into a plate shape stretching generally all over each sub-pixel. The common electrode 95 is made from a transparent electroconductive substance such as ITO (Indium Tin Oxide). The common electrode 95 is connected to an external drive circuit, thus being held at a specified potential.

A hole is formed in the common electrode 95. The hole of the common electrode 95 is larger than an upper end of the hole formed in the first insulating layer 2. A circumferential edge portion of the hole of the common electrode 95 and a circumferential edge portion of the hole of the first insulating layer 2 form a step gap.

The second insulating layer 3 is made from an inorganic insulator such as silicon nitride film having a thickness of 120 to 200 nm. The second insulating layer 3 has a flat plate portion 31 and a contact portion 32. The flat plate portion 31 is provided on the common electrode 95. The contact portion 32 is provided along a lateral face of the hole of the common electrode 95, along an upper surface and lateral face in circumferential edge portion of the hole of the first insulating layer 2, and along the upper surface in circumferential edge portion of the hole of the color filter 1. Therefore, the contact portion 32, with its lower end provided on the color filter 1, has a generally truncated cone shape.

The pixel electrode 6, which is provided one per sub-pixel, has a strip-like portion 61 and a contact portion 62. The strip-like portions 61 extend along the image signal lines 8, respectively, and each has a strip shape slightly shorter than the distance between the scan signal lines 9. The pixel electrode 6 is made from a transparent electroconductive substance such as ITO and has a thickness of 50 nm. The shape of the pixel electrodes 6 is not limited to this, and strip-like electrodes may be arrayed with intervals in plurality per sub-pixel.

The pixel electrode 6 and the common electrode 95 form a fringe electric field and controls orientation of the liquid crystal layer 400. Also, portions where the pixel electrode 6, the second insulating layer 3 and the common electrode 95 are superimposed on one another function as a capacitor, thus holding electric charge for time durations in which no voltage is applied.

The contact portion 62 is provided in adjacency to the strip-like portion 61. The contact portion 62 extends along the inner lateral face of the contact portion 32 and along the circumferential edge portion of the hole of the color filter 1 so as to form a step gap. That is, the contact portion 32 of the second insulating layer 3 covers the lateral face of the contact portion 62 from outside.

Further, the contact portion 62 is protruded downward from the contact portion 32 of the second insulating layer 3 until its lower end is in contact with the upper surface of the relay electrode 7. As a result of this, the pixel electrode 6 and the relay electrode 7 are electrically connected to each other. In addition, a conductor substance may be provided between the contact portion 62 and the relay electrode 7 so that the contact portion 62 and the relay electrode 7 are electrically connected to each other.

The insulating layer 4, the relay electrode 7, the image signal line 8, the scan signal line 9 and the semiconductor layer 94 function as active elements. An active element performs on/off control with a voltage applied to the scan signal line 9. In addition, electrodes or the like electrically connected to the relay electrode 7, the image signal line 8 or the scan signal line 9 may function as the active elements instead of the relay electrode 7, the image signal line 8 or the scan signal line 9. An active element leads a voltage responsive to an image signal inputted to the image signal line 8 at a turn-on to the relay electrode 7 and the pixel electrode 6 via the semiconductor layer 94. The pixel electrode 6 applies a voltage responsive to an image signal to the liquid crystal layer 400.

The first orientation film 96 is made from, for example, polyimide and makes liquid crystal molecules of the liquid crystal layer 400 oriented toward a certain direction. The first orientation film 96 is provided on portions of the second insulating layer 3 where no pixel electrode 6 is provided, and on the pixel electrodes 6.

Provided in the hole formed in the color filter 1 are the pixel electrode 6 with its lower end in contact with the relay electrode 7, and the first orientation film 96 in contact with inside of the pixel electrode 6. Accordingly, the first orientation film 96 is generally conical-shaped, and inside of the first orientation film 96 is filled with the liquid crystal layer 400.

Provided in the hole formed in the first insulating layer 2 are, as listed from lateral face to inside of the hole, the contact portion 32 of the second insulating layer 3, the contact portion 62 of the pixel electrode 6 in contact with inside of the contact portion 32, and the first orientation film 96 in contact with inside of the contact portion 62. Inside of the first orientation film 96 is filled with the liquid crystal layer 400. That is, the contact portion 32 of the second insulating layer 3 covers the contact portion 62 of the pixel electrode 6.

The liquid crystal layer 400, having a positive dielectric anisotropy indicating that the dielectric constant is larger in the orientation direction than in its normal direction, shows a nematic phase over a wide temperature range including room temperature. With no voltage applied thereto, the liquid crystal layer 400 shows a homogeneous orientation. As the pixel electrode 6 applies a voltage to the liquid crystal layer 400, orientations of the individual liquid crystals in the liquid crystal layer 400 are turned laterally.

The counter substrate 300 is provided on an upper side of the liquid crystal layer 400. A lower surface of the counter substrate 300 is opposed to an upper surface of the active element substrate 200. The counter substrate 300 includes a transparent substrate 301, an overcoat film 302, a second orientation film 303, and a second polarizing plate 304.

The transparent substrate 301 is, for example, a flat plate. The overcoat film 302 is provided in lower portion of the counter substrate 300. In a case where no black matrix is formed in the counter substrate 300, the overcoat film 302 may be omitted. The second orientation film 303 is provided under the overcoat film 302.

The second polarizing plate 304 is provided on the transparent substrate 301. An absorption axis of the second polarizing plate 304 and an absorption axis of the first polarizing plate 91 are so set as to be orthogonal to each other as in a plan view. Also, the absorption axis of the first polarizing plate 91 is, for example, parallel to the orientation direction of the liquid crystal layer 400.

According to this embodiment, since the contact portion 32 of the second insulating layer 3 is provided inside the hole of the first insulating layer 2, which is the second hole, the color filter 1 can be prevented from being eluted into the liquid crystal layer 400.

Also according to this embodiment, the thickness of the first insulating layer 2 is set to be within a range of 0.33 to 2 on the assumption that the thickness of the color filter 1 is 1. By virtue of this setting, the color filter 1 can be made thinner while the parasitic capacitance can be reduced.

Further according to this embodiment, since the color filter 1 is placed on the lower side of the first insulating layer 2, the hole of the color filter 1 can be made smaller than the hole of the first insulating layer 2.

Embodiment 2

Embodiment 2 will be described. This embodiment is an embodiment in which the contact portion 32 of the second insulating layer 3 is provided inside the hole of the first insulating layer 2, which is the second hole, as well as inside the hole of the color filter 1, which is the first hole.

Figure 6:
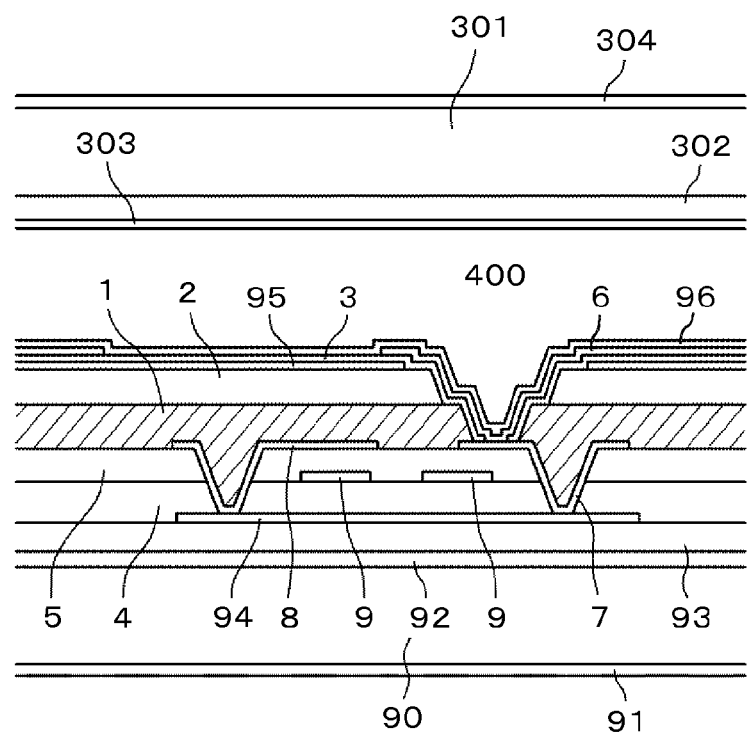
FIG. 6 is a sectional view of a liquid crystal display device in Embodiment 2.

FIG. 6 is a sectional view of a liquid crystal display device 100 in Embodiment 2. FIG. 6 corresponds to a sectional view taken along the line B-B' of FIG. 1. Hereinbelow, as for the same component members as in Embodiment 1, their description is omitted.

The hole of the color filter 1 extends through vertically so as to be formed into a downwardly tapered shape. The hole of the color filter 1 has, for example, an upper end formed into an about 4 μm-dia. circular shape and a lower end formed into an about 2 μm-dia. circular shape.

The hole of the first insulating layer 2 extends through vertically so as to be formed into a downwardly tapered shape. The hole of the first insulating layer 2 has, for example, an upper end formed into an about 8 μm-dia. circular shape and a lower end formed into an about 6 μm-dia. circular shape.

Figure 7:
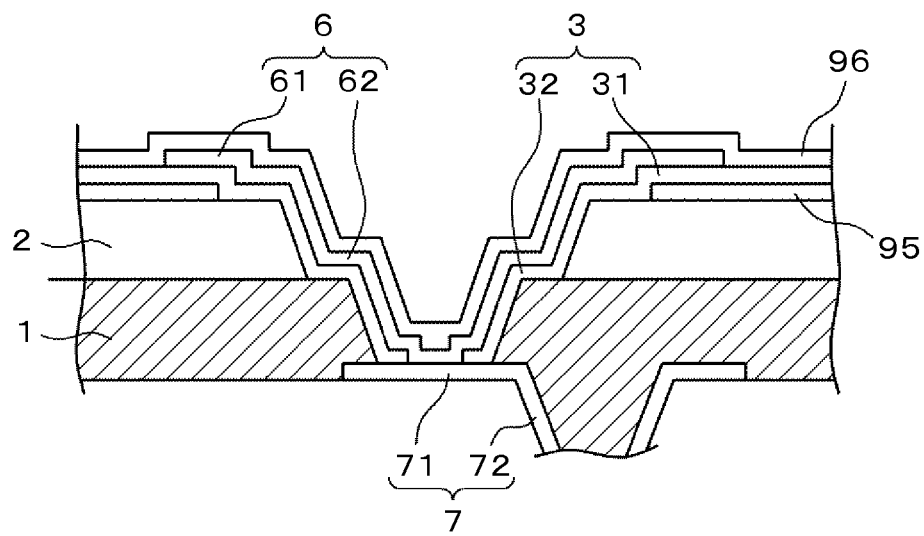
FIG. 7 is a sectional view of the liquid crystal display device in Embodiment 2.

FIG. 7 is a sectional view of the liquid crystal display device 100 in Embodiment 2. FIG. 7 is a partly enlarged view of FIG. 6. The second insulating layer 3 has a flat plate portion 31 and a contact portion 32. The flat plate portion 31 is provided on the common electrode 95. The contact portion 32 is provided along a lateral face of the hole of the common electrode 95, along an upper surface and a lateral face in circumferential edge portion of the hole of the first insulating layer 2, and along an upper surface and a lateral face in circumferential edge portion of the hole of the color filter 1, where the contact portion 32 is formed into a generally truncated cone shape. Also, a lower end of the contact portion 32 may be in contact with the relay electrode 7. The contact portion 32 of the second insulating layer 3 covers the whole contact portion 62 in the pixel electrode 6 from outside. The contact portion 32 is also in contact with the whole lateral face of the contact portion 62 and with part of its bottom face.

Provided in the hole formed in the first insulating layer 2 and the hole formed in the color filter 1 are, as listed from lateral face to inside of the holes, the second insulating layer 3, the pixel electrode 6 in contact with inside of the second insulating layer 3, and the first orientation film 96 in contact with inside of the pixel electrode 6. Inside of the first orientation film 96 is filled with the liquid crystal layer 400.

Therefore, the contact portion 32 of the second insulating layer 3 covers the whole contact portion 62 of the pixel electrode 6 from outside.

According to this embodiment, since the contact portion 32 of the second insulating layer 3 is provided inside the hole of the first insulating layer 2, which is the second hole, and inside the hole of the color filter 1, which is the first hole, the color filter 1 can more effectively be prevented from being eluted into the liquid crystal layer 400.

Embodiment 3

Embodiment 3 will be described. This embodiment is an embodiment in which the color filter 1 is provided on an upper side of the first insulating layer 2. In this embodiment, the first insulating layer 2 is the first layer, the color filter 1 is the second layer, the hole formed in the first insulating layer 2 is the first hole, and the hole formed in the color filter 1 is the second hole.

Figure 8:
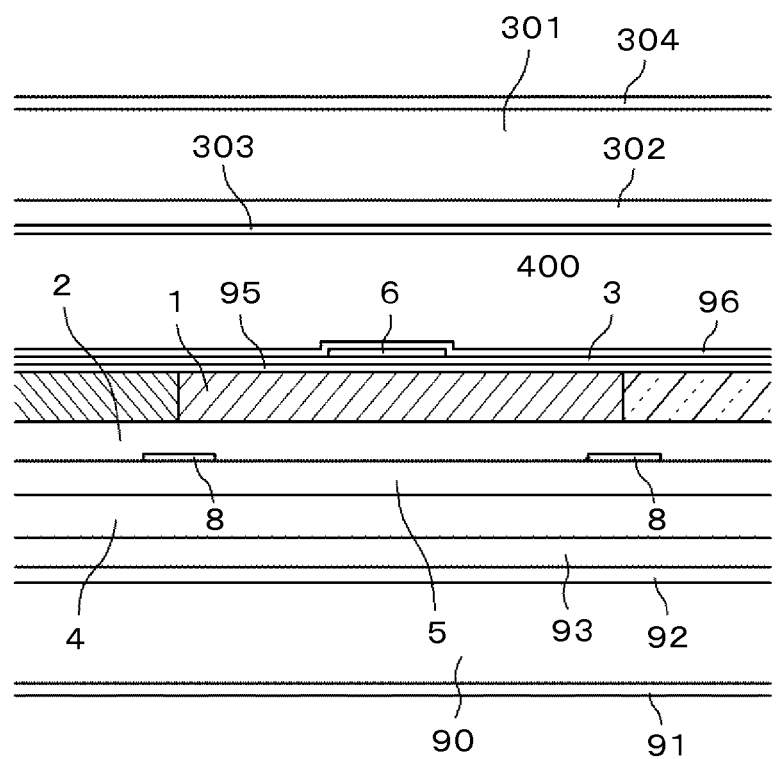
FIG. 8 is a sectional view of a liquid crystal display device in Embodiment 3.
Figure 9:
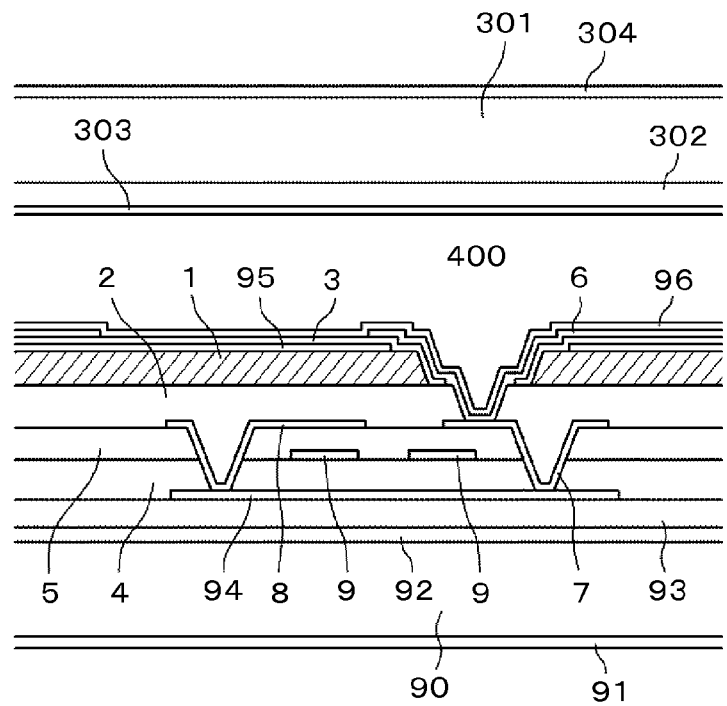
FIG. 9 is a sectional view of the liquid crystal display device in Embodiment 3.

FIG. 8 is a sectional view of a liquid crystal display device 100 in Embodiment 3. FIG. 9 is a sectional view of Embodiment 3. FIG. 8 corresponds to a sectional view taken along the line A-A' of FIG. 1. FIG. 9 corresponds to a sectional view taken along the line B-B' of FIG. 1.

The first insulating layer 2 is provided on the relay electrode 7, on the image signal line 8, and on portions of the insulating layer 5 where neither the relay electrode 7 nor the image signal line 8 is provided. The thickness of the first insulating layer 2 is, for example, 1 to 2 μm.

A hole is formed in the first insulating layer 2 so as to have, for example, an upper end formed into an about 4 μm-dia. circular shape and a lower end formed into an about 2 μm-dia. circular shape.

The color filter 1 is provided on the first insulating layer 2. The thickness of the color filter 1 is, for example, 1 to 3 μm. A thickness ratio of the color filter 1 to the first insulating layer 2 is, as in the case of Embodiment 1, such that with the thickness of the color filter 1 assumed to be 1, the thickness of the first insulating layer 2 is within a range of 0.33 to 2. More desirably as to the thicknesses of the color filter 1 and the first insulating layer 2, with the thickness of the color filter 1 assumed to be 1, the thickness of the first insulating layer 2 is within a range of 0.4 to 1.5.

In the color filter 1, a hole is formed on an upper side of the hole of the first insulating layer 2. The hole of the color filter 1 extends through vertically so as to be formed into a downwardly tapered shape. The hole of the color filter 1 has, for example, an upper end formed into an about 8 μm-dia. circular shape and a lower end formed into an about 6 μm-dia. circular shape.

The second insulating layer 3 has a flat plate portion 31 and a contact portion 32. The flat plate portion 31 is provided on the common electrode 95. The contact portion 32 is provided along a lateral face of the hole of the common electrode 95, along an upper surface and a lateral face in circumferential edge portion of the hole of the color filter 1, and along the upper surface in circumferential edge portion of the hole of the first insulating layer 2, where the contact portion 32 is formed into a generally truncated cone shape.

According to this embodiment, since the color filter 1 is provided on the upper side of the first insulating layer 2, the hole of the first insulating layer 2, which is required to be reduced in size, can be fabricated with simplicity. Also, since the contact portion 32 of the second insulating layer 3 is provided inside the hole of the color filter 1, which is the second layer, the color filter 1 can be prevented from being eluted into the liquid crystal layer 400.

Further according to this embodiment, since the color filter 1 is provided on the upper side of the first insulating layer 2, the color filter 1 and the liquid crystal layer 400 become closer to each other, making color mixture less likely to occur.

Embodiment 4

Embodiment 4 will be described. This embodiment is an embodiment in which the contact portion 32 of the second insulating layer 3 is provided inside the hole of the first insulating layer 2, which is the second hole, and inside the hole of the color filter 1, which is the first hole, as in the case of Embodiment 2, and moreover in which the color filter 1 is provided on an upper side of the first insulating layer 2 as in the case of Embodiment 3.

Figure 10:
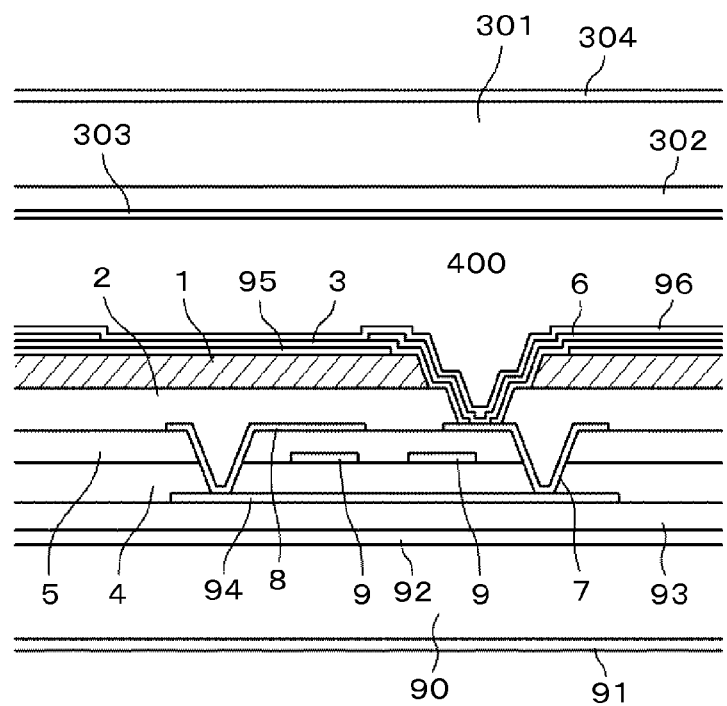
FIG. 10 is a sectional view of a liquid crystal display device in Embodiment 4.

FIG. 10 is a sectional view of Embodiment 4. The flat plate portion 31 of the second insulating layer 3 is provided on the common electrode 95. The contact portion 32 of the second insulating layer 3 is provided along a lateral face of the hole of the common electrode 95, along an upper surface in circumferential edge portion of the hole and a lateral face of the hole of the color filter 1, and along an upper surface and a lateral face in circumferential edge portion of the hole of the first insulating layer 2, where the contact portion 32 is formed into a generally truncated cone shape. That is, the contact portion 32 is provided inside the hole of the color filter 1 and the hole of the first insulating layer 2.

Also, the lower end of the contact portion 32 is in contact with the relay electrode 7. That is, the contact portion 32 of the second insulating layer 3 covers the whole contact portion 62 of the pixel electrode 6 from outside. Further, the contact portion 32 of the second insulating layer 3 is in contact with the whole lateral face of the contact portion 62 of the pixel electrode 6 and with part of its bottom face.

Embodiment 5

Embodiment 5 will be described. This embodiment is an embodiment in which the first insulating layer 2 includes a contact portion 22 as a third contact portion, the contact portion 22 being provided inside the hole of the color filter 1.

Figure 11:
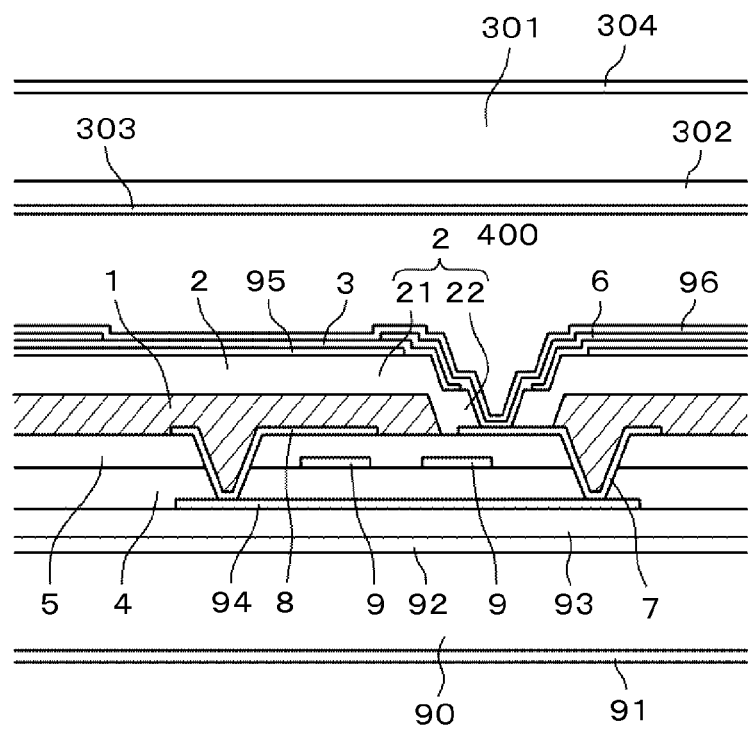
FIG. 11 is a sectional view of a liquid crystal display device in Embodiment 5.

FIG. 11 is a sectional view of a liquid crystal display device 100 in Embodiment 5. The color filter 1 is provided on the relay electrode 7, on the image signal line 8, and on portions of the insulating layer 5 where neither the relay electrode 7 nor the image signal line 8 is provided on the upper side. The hole of the color filter 1 extends through vertically so as to be formed into a downwardly tapered shape. The hole of the color filter 1 has, for example, an upper end formed into an about 10 μm-dia. circular shape and a lower end formed into an about 8 μm-dia. circular shape.

The first insulating layer 2 has a plate-like portion 21 and a contact portion 22. The plate-like portion 21 is provided on an upper side of the color filter 1. The contact portion 22 is protruded downward, having a truncated cone shape extending along a lateral face of the hole of the color filter 1. The contact portion 22 has a lower end in contact with the relay electrode 7. In addition, the contact portion 22 may be in contact with the insulating layer 5.

Also, a hole is formed in the first insulating layer 2. The hole of the first insulating layer 2 extends vertically through the contact portion 22 so as to be formed into a downwardly tapered shape. The hole of the first insulating layer 2 may have a step gap at the same location in the vertical direction as in the upper surface of the color filter 1. The lateral face of the hole of the first insulating layer 2 is in contact with the lateral face of the contact portion 62 of the pixel electrode 6.

The second insulating layer 3 has a flat plate portion 31 and a contact portion 32. The flat plate portion 31 is provided on the common electrode 95. The contact portion 32 is provided along an upper surface in circumferential edge portion of the hole of the first insulating layer 2 as well as along part of its lateral face, where the contact portion 32 is formed into a generally truncated cone shape.

According to this embodiment, the first insulating layer 2 includes the contact portion 22, and the contact portion 22 is provided inside the hole of the color filter 1. Therefore, for fabrication of the color filter 1, its hole does not need to be shaped along the pixel electrode 6, facilitating the fabrication.

Embodiment 6

Embodiment 6 will be described. This embodiment is an embodiment in which the contact portion 22 is provided inside the hole of the color filter 1 as in the case of Embodiment 5, and moreover in which the contact portion 32 of the second insulating layer 3 is provided inside the hole of the first insulating layer 2, which is the second hole, and inside the hole of the color filter 1, which is the first hole, as in the case of Embodiment 2.

Figure 12:
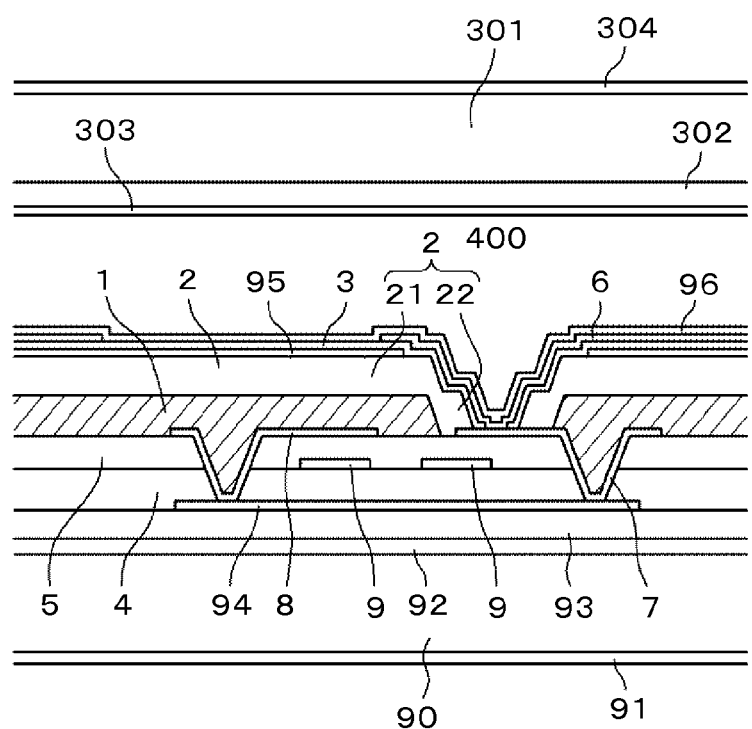
FIG. 12 is a sectional view of a liquid crystal display device in Embodiment 6.

FIG. 12 is a sectional view of a liquid crystal display device 100 in Embodiment 6. The hole formed in the color filter 1 extends through vertically so as to be formed into a downwardly tapered shape. The hole of the color filter 1 has, for example, an upper end formed into an about 10 μm-dia. circular shape and a lower end formed into an about 8 μm-dia. circular shape.

The plate-like portion 21 of the first insulating layer 2 is provided on an upper side of the color filter 1. The contact portion 22 is protruded downward and formed into a truncated cone shape extending along the lateral face of the hole. The contact portion 22 is partly in contact with the relay electrode 7. Also, the contact portion 22 is in contact with the whole lateral face of the contact portion 62 of the pixel electrode 6 and with part of the bottom face.

Also, a hole is formed in the first insulating layer 2. The hole of the first insulating layer 2 extends vertically through the contact portion 22 so as to be formed into a downwardly tapered shape. Also, the hole of the first insulating layer 2 has a step gap provided at the same location in the vertical direction as in the upper surface of the color filter 1.

The flat plate portion 31 of the second insulating layer 3 is provided on the common electrode 95. The contact portion 32 is provided along an upper surface in circumferential edge portion of the hole of the first insulating layer 2 as well as along its whole lateral face, where the contact portion 32 is formed into a generally truncated cone shape. Also, a lower end of the contact portion 32 is in contact with the relay electrode 7. The contact portion 32 is provided outside the contact portion 62 in the pixel electrode 6. The contact portion 32 is also in contact with the whole lateral face of the contact portion 62 and with part of its bottom face.

According to this embodiment, the contact portion 22 is provided inside the hole of the color filter 1. Also, the contact portion 32 of the second insulating layer 3 is provided inside the hole of the color filter 1 and inside the hole of the first insulating layer 2. Therefore, the color filter 1 can more effectively be prevented from being eluted into the liquid crystal layer 400.

Embodiment 7

Embodiment 7 will be described. This embodiment is an embodiment in which the color filter 1 is provided on an upper side of the first insulating layer 2 as in the case of Embodiment 3, and moreover in which a contact portion 12 of the color filter 1, which is a third contact portion, is provided inside the hole of the first insulating layer 2.

Figure 13:
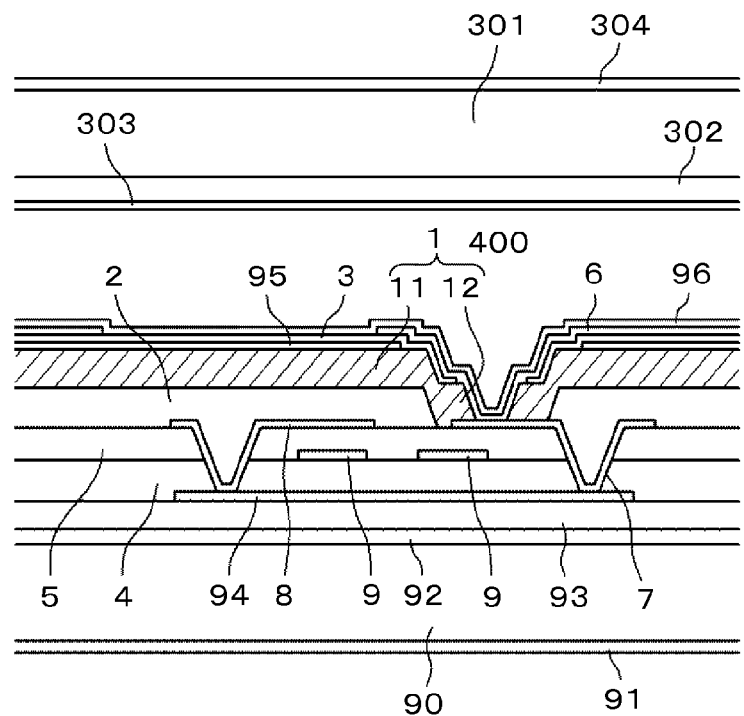
FIG. 13 is a sectional view of a liquid crystal display device in Embodiment 7.

FIG. 13 is a sectional view of a liquid crystal display device 100 in Embodiment 7. The first insulating layer 2 is provided on the relay electrode 7, on the image signal line 8, and on portions of the insulating layer 5 where neither the relay electrode 7 nor the image signal line 8 is provided on an upper side. The hole of the first insulating layer 2 extends through vertically so as to be formed into a downwardly tapered shape. The hole of the first insulating layer 2 has, for example, an upper end formed into an about 10 μm-dia. circular shape and a lower end formed into an about 8 μm-dia. circular shape.

The color filter 1 has a plate-like portion 11 and a contact portion 12. The plate-like portion 11 is provided on an upper side of the first insulating layer 2. The contact portion 12 is protruded downward, having a truncated cone shape extending along a lateral face of the hole of the first insulating layer 2. The contact portion 12 has a lower end in contact with the relay electrode 7. In addition, the contact portion 12 may be in contact with the insulating layer 5.

Also, a hole is formed in the color filter 1. The hole of the color filter 1 extends vertically through the contact portion 12 so as to be formed into a downwardly tapered shape. The hole of the color filter 1 has a step gap formed at the same location in the vertical direction as in the upper surface of the color filter 1. The lateral face of the hole of the color filter 1 is in contact with the lateral face of the contact portion 62 of the pixel electrode 6.

The second insulating layer 3 has a flat plate portion 31 and a contact portion 32. The flat plate portion 31 is provided on the common electrode 95. The contact portion 32 is provided along the upper surface in circumferential edge portion of the hole of the color filter 1 as well as along part of the lateral face of the hole, where the contact portion 32 is formed into a generally truncated cone shape.

According to this embodiment, the color filter 1, which is the second layer, is provided on the upper side of the first insulating layer 2, which is the first layer, and moreover the contact portion 12 of the color filter 1 is provided inside the hole of the first insulating layer 2. Therefore, for fabrication of the first insulating layer 2, its hole does not need to be shaped along the pixel electrode 6, facilitating the fabrication.

Embodiment 8

Embodiment 8 will be described. This embodiment is an embodiment in which the contact portion 12 of the color filter 1 is provided inside the hole of the first insulating layer 2 as in the case of Embodiment 7, and moreover in which the contact portion 32 of the second insulating layer 3 is provided inside the hole of the first insulating layer 2, which is the second hole, and inside the hole of the color filter 1, which is the first hole.

Figure 14:
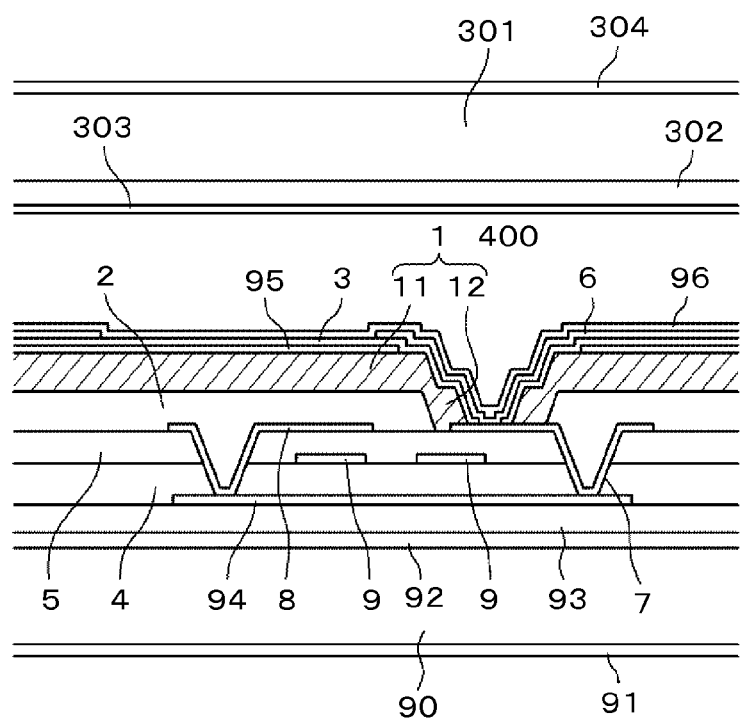
FIG. 14 is a sectional view of a liquid crystal display device in Embodiment 8.

FIG. 14 is a sectional view of a liquid crystal display device 100 in Embodiment 8. The hole formed in the first insulating layer 2 extends through vertically so as to be formed into a downwardly tapered shape. The hole of the first insulating layer 2 has, for example, an upper end formed into an about 10 μm-dia. circular shape and a lower end formed into an about 8 μm-dia. circular shape.

The plate-like portion 11 of the color filter 1 is provided on an upper side of the first insulating layer 2. The contact portion 12 is protruded downward, having a truncated cone shape extending along a lateral face of the hole. The contact portion 12 is partly in contact with the relay electrode 7. Also, the contact portion 12 is in contact with the whole lateral face of the contact portion 62 of the pixel electrode 6 and with part of the bottom face.

Also, a hole is formed in the color filter 1. The hole of the color filter 1 extends vertically through the contact portion 12 so as to be formed into a downwardly tapered shape. The hole of the color filter 1 has a step gap formed at the same location in the vertical direction as in the upper surface of the first insulating layer 2.

The flat plate portion 31 of the second insulating layer 3 is provided on the common electrode 95. The contact portion 32 is provided along a lateral face of the contact portion 62, where the contact portion 32 is formed into a generally truncated cone shape. Also, the contact portion 32 has a step gap as in the hole of the color filter 1. The contact portion 32 is provided outside the contact portion 62 of the pixel electrode 6.

The color filter 1 is partly in contact with the relay electrode 7. Also, the color filter 1 is in contact with the whole lateral face of the contact portion 62 of the pixel electrode 6 and with part of the bottom face.

According to this embodiment, the contact portion 12 of the color filter 1 is provided inside the hole of the first insulating layer 2, and moreover the contact portion 32 of the second insulating layer 3 is provided inside the hole of the first insulating layer 2, which is the second hole, and inside the hole of the color filter 1, which is the first hole. Therefore, the color filter 1 can be prevented from being eluted into the liquid crystal layer 400.

Embodiment 9

Embodiment 9 will be described. This embodiment is an embodiment in which the hole formed in the color filter 1 and the hole formed in the first insulating layer 2 are collectively formed.

Figure 15:
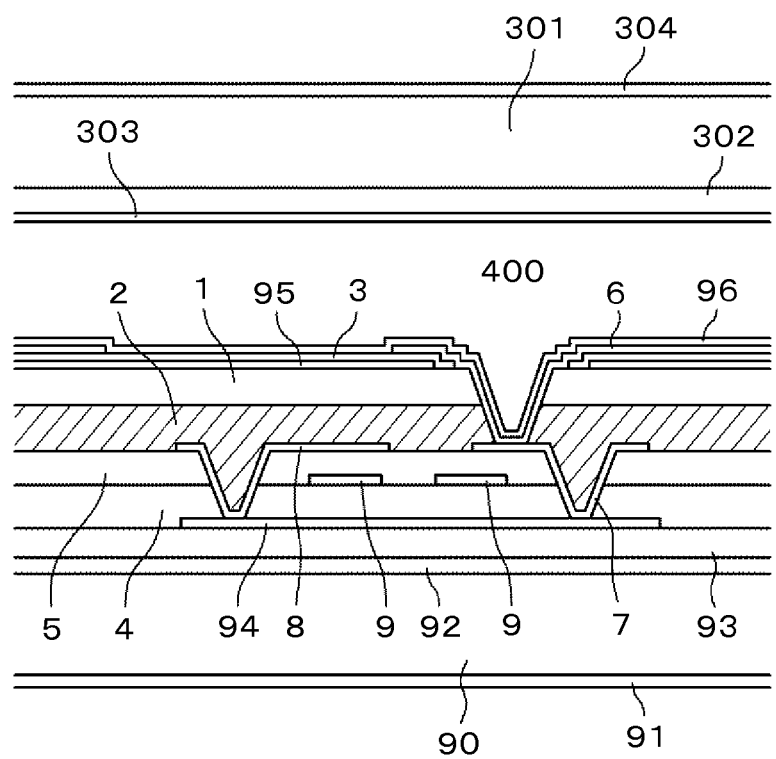
FIG. 15 is a sectional view of a liquid crystal display device in Embodiment 9.
Figure 16A:
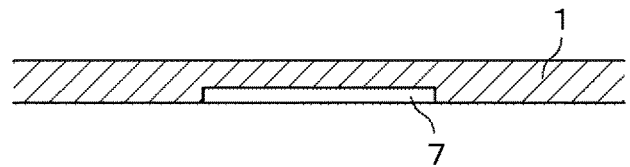
FIG. 16A is a view showing a manufacturing method for the liquid crystal display device in Embodiment 9.
Figure 16A:
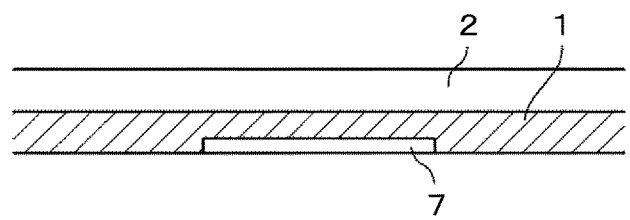
Figure 16A:
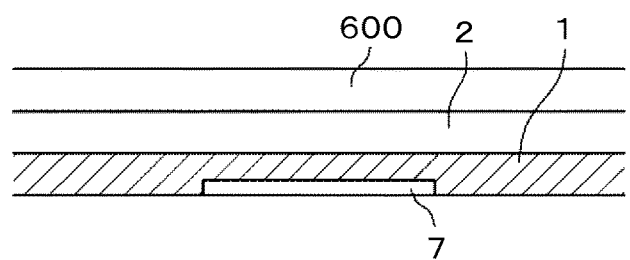
Figure 16A:
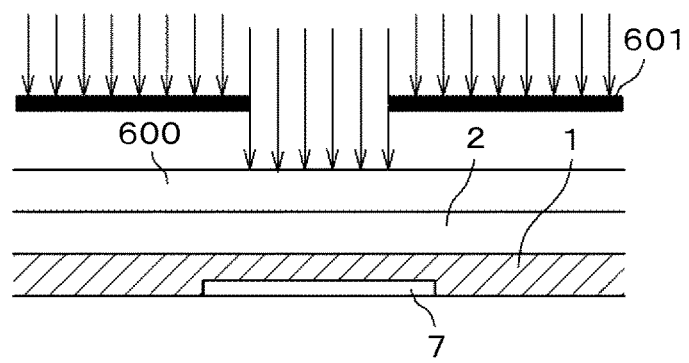
Figure 16B:
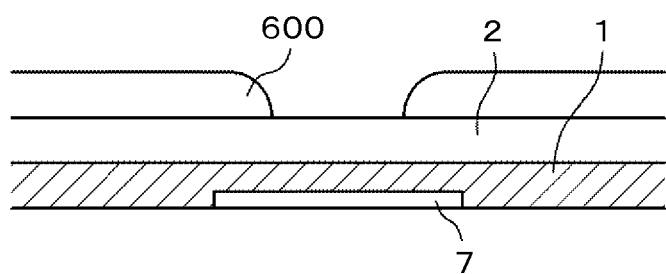
FIG. 16B is a view showing a manufacturing method for the liquid crystal display device in Embodiment 9.
Figure 16B:
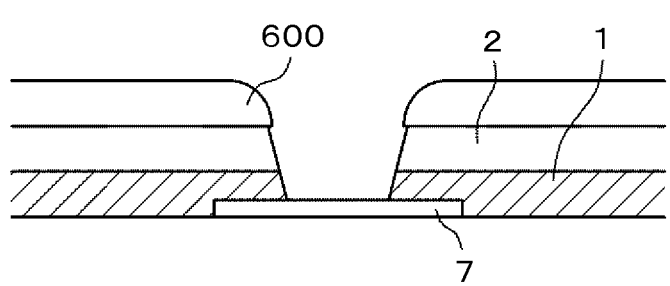
Figure 16B:
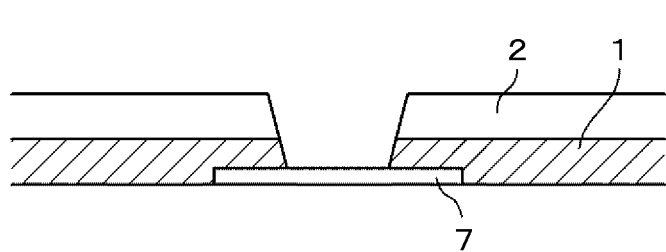

FIG. 15 is a sectional view of a liquid crystal display device 100 in Embodiment 9. FIG. 16A is a view showing a manufacturing method for the liquid crystal display device 100 in Embodiment 9. FIG. 16B is a view showing a manufacturing method for the liquid crystal display device 100 in Embodiment 9. FIG. 16A and FIG. 16B show steps for forming holes in the color filter 1 and the first insulating layer 2, respectively.

The manufacturing method will be described. As shown in FIG. 16A(a), the color filter 1 is provided on the relay electrode 7, on the image signal line 8, and on portions of the insulating layer 5 where neither the relay electrode 7 nor the image signal line 8 is provided (S1).

As shown in FIG. 16A(b), the first insulating layer 2 is provided on the color filter 1 (S2). As shown in FIG. 16A(c), a resist 600 is applied onto the first insulating layer 2 (S3). The resist 600 is selectively applied by, for example, the ink jet method so that a specified pattern is formed.

As shown in FIG. 16A(d), a photomask 601 with a specified pattern formed thereon is laid on the resist 600 and exposed to light (S4). As a result, exposed portions are cured, by which a hole generally identical in shape to the above-mentioned hole is provided in the resist 600.

As shown in FIG. 16B(e), the photomask 601 is removed and the resist 600 is developed (S5). As shown in FIG. 16B(f), the hole of the color filter 1 and the hole of the first insulating layer 2 are formed by dry etching (S6). Also, heat treatment is performed so that the hole of the color filter 1 and the hole of the first insulating layer 2 are formed each into a downwardly tapered shape. As shown in FIG. 16B(g), the resist 600 is finally removed (S7). The hole of the color filter 1 manufactured as described above has a lower-end diameter of about 2 μm, and the hole of the first insulating layer 2 has an upper-end diameter of about 4 μm. The hole of the second insulating layer 3, which is concentric with the hole of the first insulating layer 2, has a diameter of about 5 μm. The hole of the common electrode 95 has a diameter of about 7 μm.

According to this embodiment, since the hole of the color filter 1 and the hole of the first insulating layer 2 are collectively formed, there is no need for forming any step gap for positional alignment. Therefore, the hole of the first insulating layer 2, which is the second layer, can be reduced in size.

According to this embodiment, since the hole of the first insulating layer 2 can be reduced in size, the color filter 1 can effectively be prevented from being eluted into the liquid crystal layer 400.

In FIG. 15, the contact portion 32 of the second insulating layer 3 is not provided inside the hole of the color filter 1. However, the contact portion 32 may be provided inside the hole of the color filter 1, as in the case of Embodiment 1 or the like.

Figure 17:
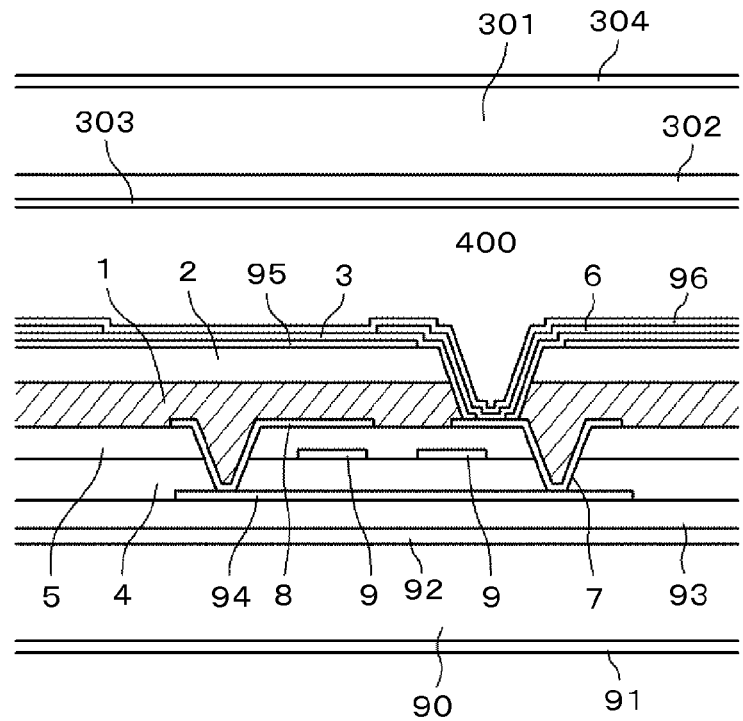
FIG. 17 is a sectional view of the liquid crystal display device in Embodiment 9.

FIG. 17 is a sectional view of a liquid crystal display device showing a modification of Embodiment 9. The contact portion 32 of the second insulating layer 3 may be provided inside the hole of the color filter 1 or may be in contact with the relay electrode 7. This case is also included in this embodiment.

Embodiment 10

Embodiment 10 will be described. This embodiment is an embodiment in which the hole formed in the first insulating layer 2 and the hole formed in the color filter 1 are collectively formed.

Figure 18:
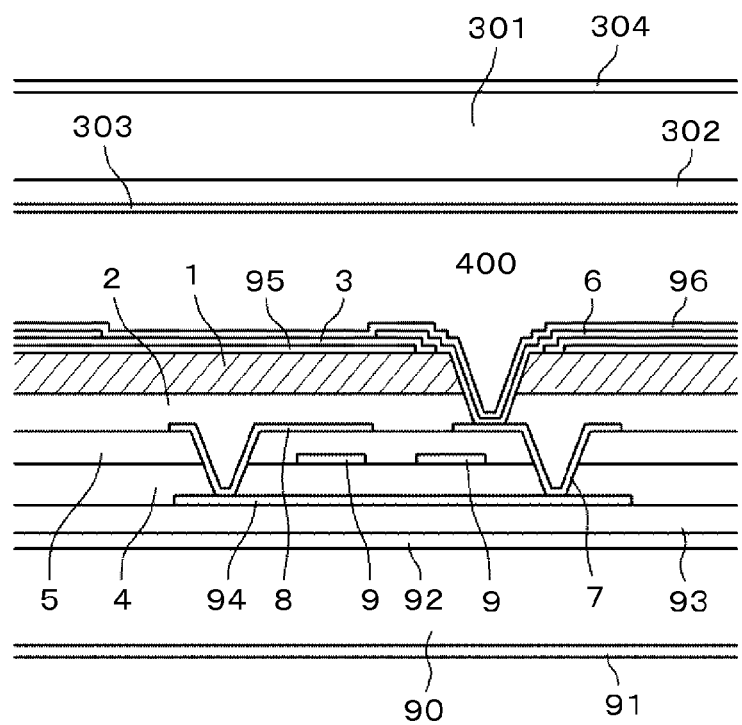
FIG. 18 is a sectional view of a liquid crystal display device in Embodiment 10.
Figure 19A:
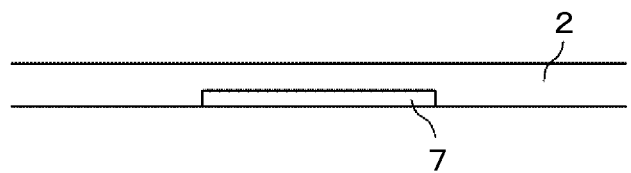
FIG. 19A is a view showing a manufacturing method for the liquid crystal display device in Embodiment 10.
Figure 19A:
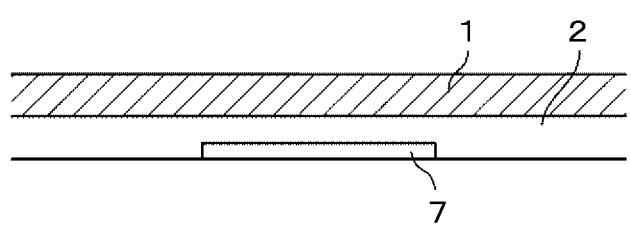
Figure 19A:
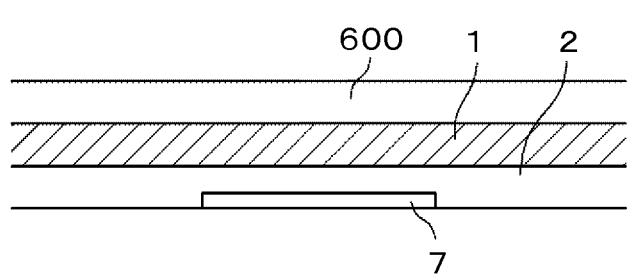
Figure 19A:
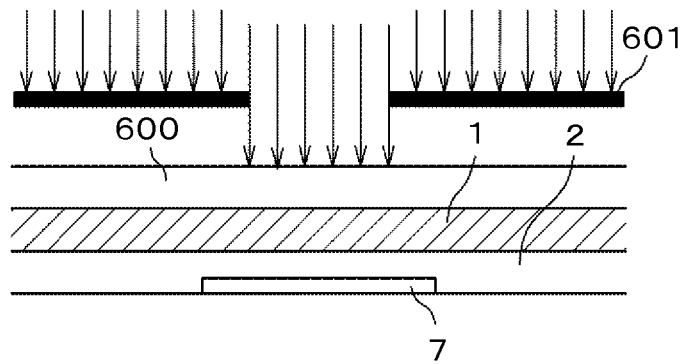
Figure 19B:
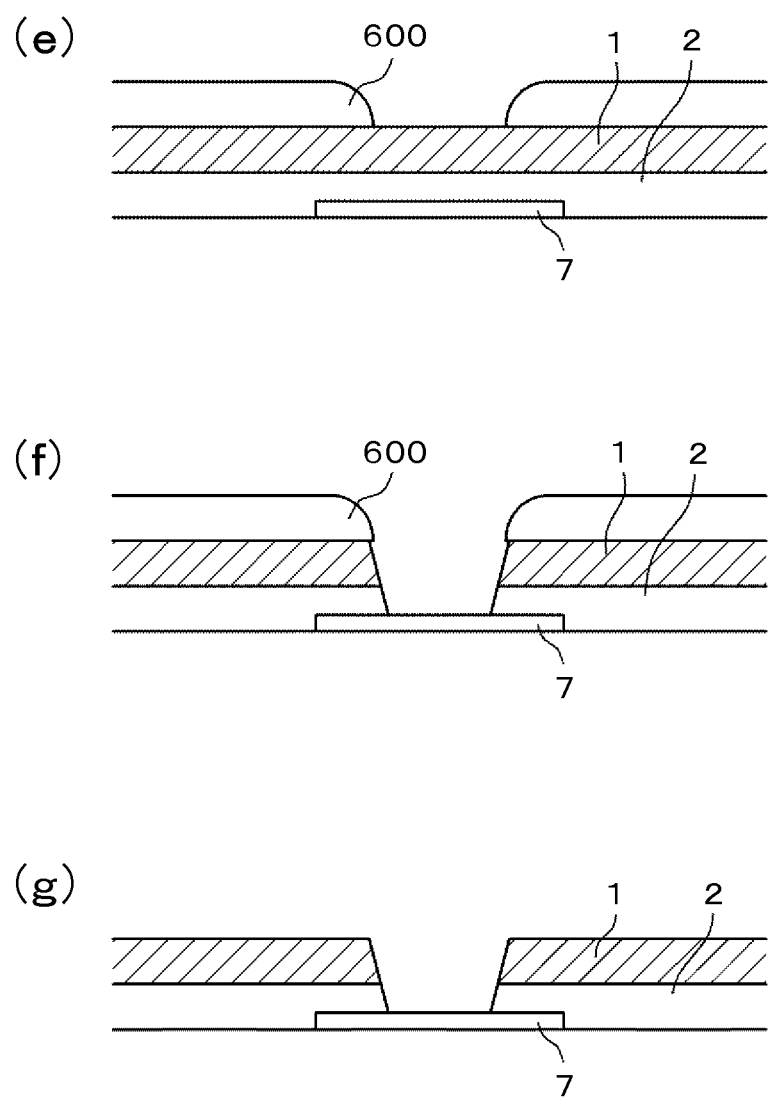
FIG. 19B is a view showing a manufacturing method for the liquid crystal display device in Embodiment 10.

FIG. 18 is a sectional view of a liquid crystal display device in Embodiment 10. FIG. 19A is a view showing a manufacturing method for the liquid crystal display device in Embodiment 10. FIG. 19B is a view showing a manufacturing method for the liquid crystal display device in Embodiment 10. FIG. 19A and FIG. 19B show steps for forming holes in the first insulating layer 2 and the color filter 1, respectively.

The manufacturing method will be described. As shown in FIG. 19A(a), the first insulating layer 2 is provided on the relay electrode 7, on the image signal line 8, and on portions of the insulating layer 5 where neither the relay electrode 7 nor the image signal line 8 is provided (S11).

As shown in FIG. 19A(b), the color filter 1 is provided on the first insulating layer 2 (S12). As shown in FIG. 19A(c), a resist 600 is applied onto the first insulating layer 2 (S13). The resist 600 is, for example, a positive-type one as in the first insulating layer 2. The resist 600 is selectively applied by, for example, the ink jet method so that a specified pattern is formed.

As shown in FIG. 19A(d), a photomask 601 with a specified pattern formed thereon is laid on the resist 600 and exposed to light (S14). As a result, exposed portions are cured, by which a hole generally identical in shape to the above-mentioned hole is provided in the resist 600.

As shown in FIG. 19B(e), the photomask 601 is removed and the resist 600 is developed (S15). As shown in FIG. 19B(f), the hole of the first insulating layer 2 and the hole of the color filter 1 are formed by dry etching (S16). Also, heat treatment is performed so that the hole of the first insulating layer 2 and the hole of the color filter 1 are formed each into a downwardly tapered shape. As shown in FIG. 19B(g), the resist 600 is finally removed (S17).

The hole of the first insulating layer 2 manufactured as described above has a lower-end diameter of about 2 μm, and the hole of the color filter 1 has an upper-end diameter of about 4 μm. The hole of the second insulating layer 3, which is concentric with the hole of the first insulating layer 2, has a diameter of about 5 μm. The hole of the common electrode 95 has a diameter of about 7 μm.

According to this embodiment, since the hole of the first insulating layer 2 and the hole of the color filter 1 are collectively formed, there is no need for forming any step gap for positional alignment. Therefore, the hole of the color filter 1, which is the second hole, can be reduced in size.

Light reflected from metallic substances such as the relay electrode 7 may be transmitted through inside of the hole of the color filter 1 and inside of the hole of the first insulating layer 2. According to this embodiment, by size reduction of the hole of the color filter 1, transmission of reflected light by the relay electrode 7 or the like can be reduced.

Figure 20:
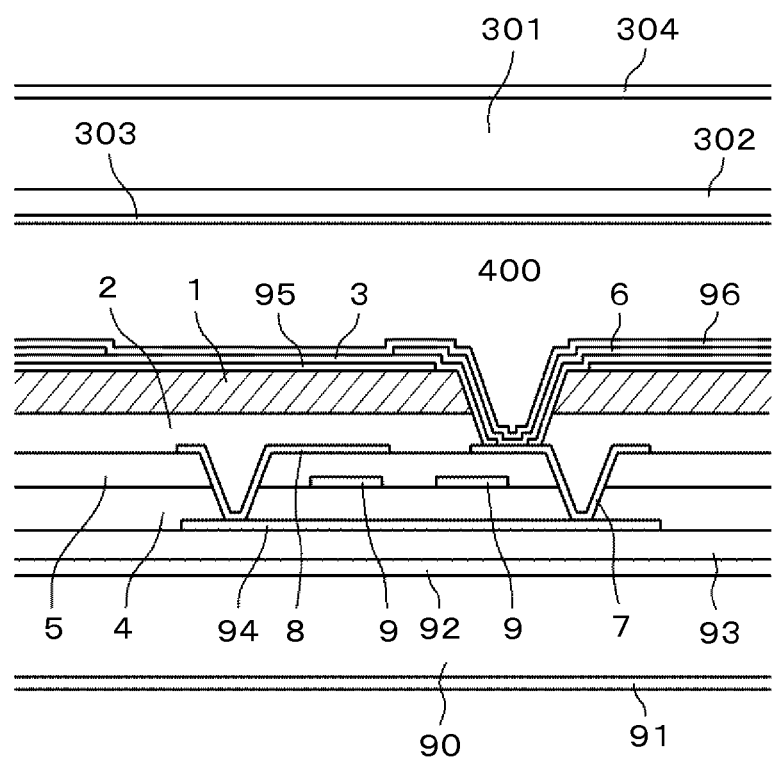
FIG. 20 is a sectional view of the liquid crystal display device in Embodiment 10.

FIG. 20 is a sectional view of a liquid crystal display device showing a modification of Embodiment 10. The contact portion 32 of the second insulating layer 3 may be provided inside the hole of the first insulating layer 2 and further may be in contact with the relay electrode 7. This case is also included in this embodiment.

Embodiment 11

Embodiment 11 will be described. This embodiment is an embodiment in which part of the lower end of the contact portion 32 of the second insulating layer 3 is provided inside the hole of the color filter 1, which is the first layer, while the other part of the lower end of the contact portion 32 is provided inside the hole of the second insulating layer 3, which is the second layer.

Figure 21:
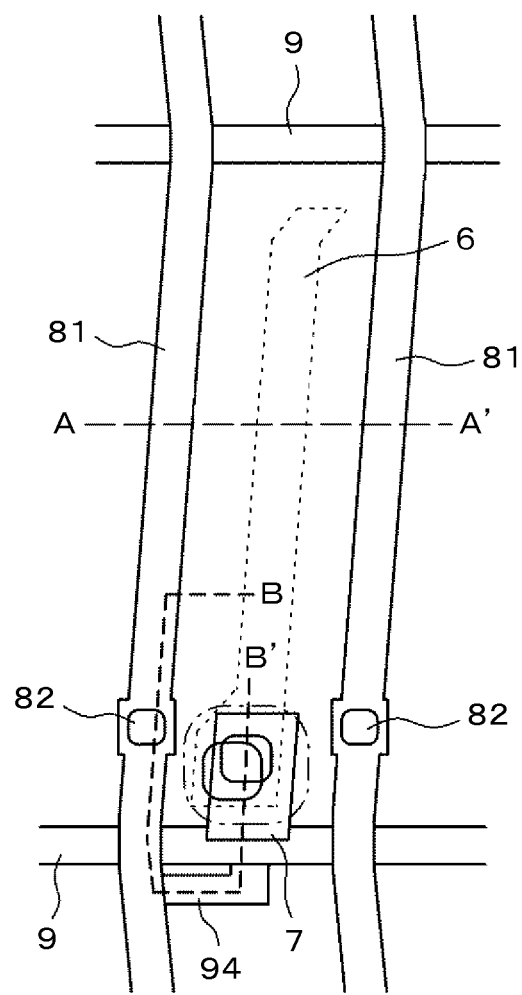
FIG. 21 is a plan view of an active element substrate in Embodiment 11.
Figure 22:
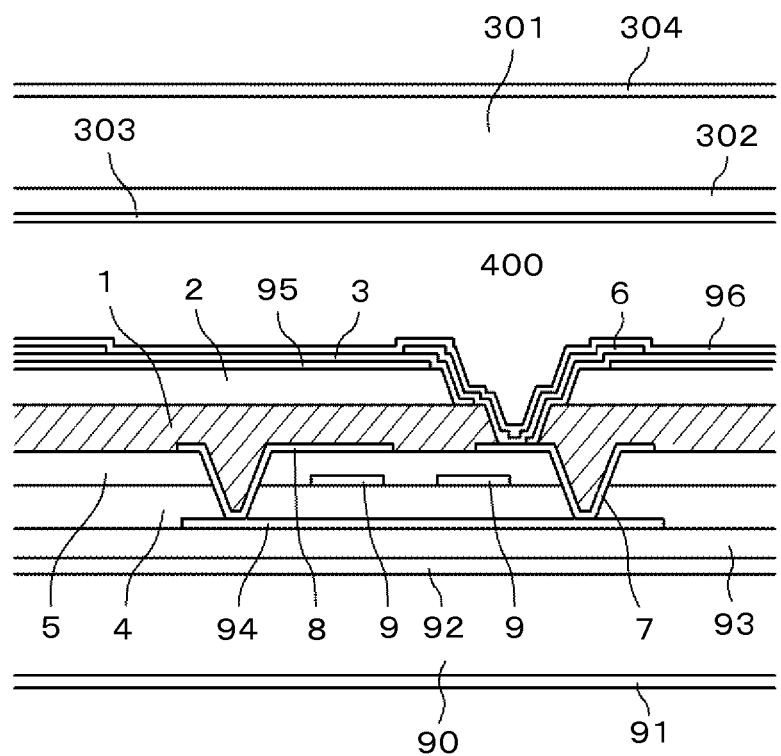
FIG. 22 is a sectional view of a liquid crystal display device in Embodiment 11.

FIG. 21 is a plan view of an active element substrate 200 in Embodiment 11. FIG. 22 is a sectional view of a liquid crystal display device 100 in Embodiment 11. FIG. 22 is a sectional view taken along the line B-B' of FIG. 21. The hole of the color filter 1 and the hole of the second insulating layer 3 are much decentered from each other as in a plan view. A direction of the decentering may be a direction extending along the image signal line 8 or may be a direction extending along the scan signal line 9.

Part of the lower end of the contact portion 32 is provided at an upper surface of the color filter 1. Also, another part of the lower end of the contact portion 32 is in contact with the relay electrode 7. The rest of the lower end of the contact portion 32 is provided midway in the hole of the color filter 1. Further, it is allowable that the first layer is the first insulating layer 2 and the second layer is the color filter 1, as in Embodiment 3.

Embodiment 12

Embodiment 12 will be described. This embodiment is an embodiment in which a first spacer 500 and a second spacer 550 are used.

Figure 23:
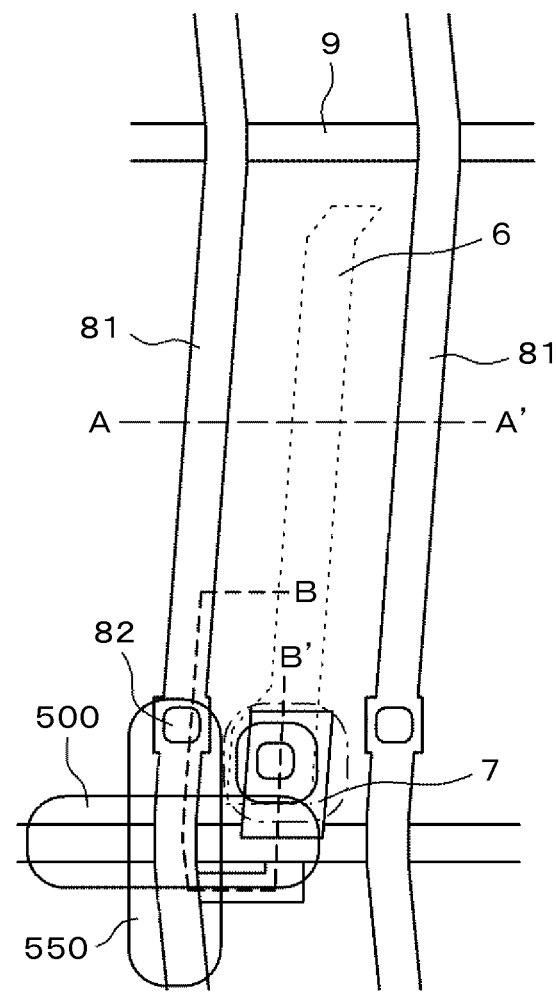
FIG. 23 is a plan view of an active element substrate in Embodiment 12.
Figure 24:
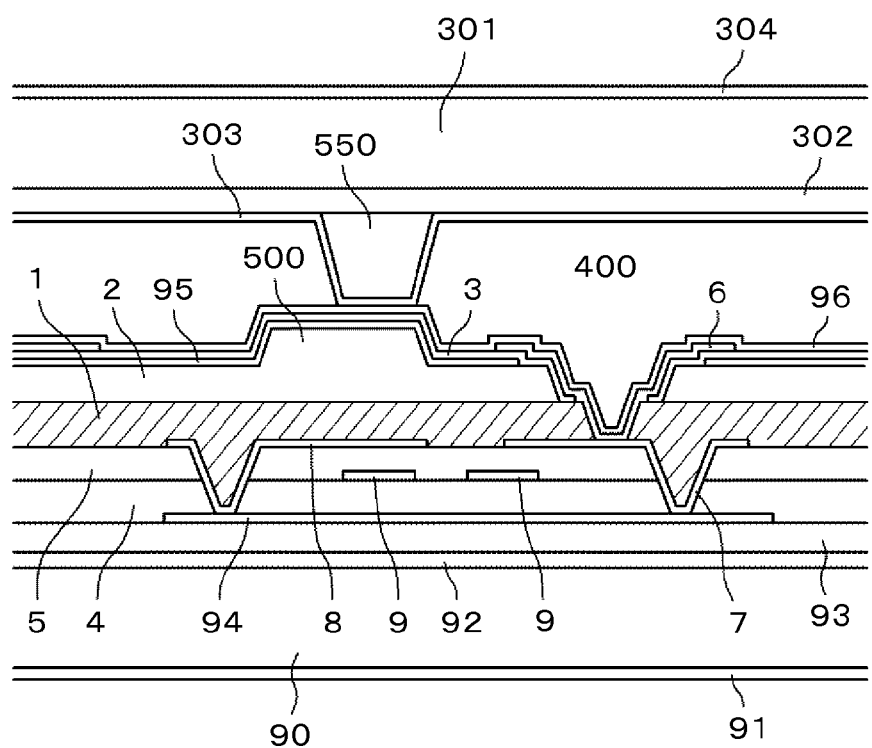
FIG. 24 is a sectional view of a liquid crystal display device in Embodiment 12.

FIG. 23 is a plan view of an active element substrate 200 in Embodiment 12. FIG. 24 is a sectional view of a liquid crystal display device 100 in Embodiment 12. FIG. 24 is a sectional view taken along the line A-A' of FIG. 23. FIG. 24 is a view schematically showing a place where the first spacer 500 and the second spacer 550 are provided. The first insulating layer 2 has a first spacer 500. The first spacer 500, having a beam shape extending along the scan signal line 9, is formed into a generally rectangular parallelepiped shape as an example. The first spacer 500 is protruded upward.

The counter substrate 300 has a second spacer 550. The second spacer 550 is provided in the overcoat film 302. The second spacer 550, having a beam shape extending along the image signal line 8, is formed into a generally rectangular parallelepiped shape as an example. The second spacer 550 is protruded downward. At a place where the first spacer 500 and the second spacer 550 are provided, the active element substrate 200 and the counter substrate 300 are in contact with each other.

The first spacer 500 and the second spacer 550 are provided at positions where the image signal line 8 and the scan signal line 9 cross each other, as in a plan view. In addition, the first spacer 500 may be formed into a columnar shape extending along the scan signal line 9, and the second spacer 550 may be formed into a columnar shape extending along the image signal line 8.

Embodiments disclosed hereinabove should be construed as only exemplifications at all points and not being limitative. The scope of the present invention is defined not by the above-described sense but by the appended claims, and is intended to include the senses equal to the appended claims as well as all changes and modifications within the scope. Also, technical features described in the individual embodiments may be combined with one another, such combinations allowing novel technical features to be created.

What is claimed is:

1. A liquid crystal display device comprising:
    an active element substrate, a counter substrate opposed from above to the active element substrate, and a liquid crystal layer provided between the active element substrate and the counter substrate,
    wherein the active element substrate includes:
    an active element;
    a first layer provided on the active element and having a first hole formed therein, the first layer being a color filter;
    a second layer provided on the first layer and having a second hole formed therein, the second layer being a first insulating layer;
    a common electrode provided on the second layer;
    a second insulating layer having a plate-like portion provided on the common electrode and a first contact portion protruded downward; and
    a pixel electrode having a plate-like portion provided on the second insulating layer and a second contact portion protruded downward, wherein the first contact portion is provided inside the second hole, and the second contact portion is provided inside the first hole and inside the second hole and electrically connected to the active element,
    wherein the second layer is between the first layer and the second insulating layer,
    wherein the common electrode is between the second layer and the second insulating layer, and
    a first diameter of the first hole, wherein the first diameter is located proximate to a relay electrode, is larger than a second diameter of the second hole, wherein the second diameter is located proximate to the relay electrode.

2. The liquid crystal display device as claimed in claim 1, wherein with a thickness of the color filter assumed to be 1, a thickness of the first insulating layer is within a range of 0.33 to 2.

3. The liquid crystal display device as claimed in claim 2, wherein the first contact portion is provided inside the first hole.

4. The liquid crystal display device as claimed in claim 2, wherein the second layer includes a third contact portion protruded inward of the first hole.

5. The liquid crystal display device as claimed in claim 1, wherein the first contact portion is provided inside the first hole.

6. The liquid crystal display device as claimed in claim 5, wherein the second layer includes a third contact portion protruded inward of the first hole.

7. The liquid crystal display device as claimed in claim 6,
    wherein the active element has a semiconductor layer, a third insulating layer is formed on the active element, a scan signal line is formed on the third insulating layer, a fourth insulating layer is formed on the scan signal line,
    the relay electrode is formed on the fourth insulating layer,
    wherein the third insulating layer and the fourth insulating layer have a third hole,
    the relay electrode contacts with the semiconductor layer via the third hole, and
    wherein the color filter is filled in the third hole.

8. The liquid crystal display device as claimed in claim 7, wherein the pixel electrode faces the common electrode, and does not have a slit.

9. The liquid crystal display device as claimed in claim 1, wherein the second layer includes a third contact portion protruded inward of the first hole.

10. A liquid crystal display device comprising:
    an active element substrate, a counter substrate opposed from above to the active element substrate, and a liquid crystal layer provided between the active element substrate and the counter substrate,
    wherein the active element substrate includes:
    an active element;
    a first layer provided on the active element and having a first hole formed therein, the first layer being a color filter;
    a second layer provided on the first layer and having a second hole formed therein, the second layer being a first insulating layer;
    a common electrode provided on the second layer;
    a second insulating layer having a plate-like portion provided on the common electrode and a first contact portion protruded downward; and
    a pixel electrode having a plate-like portion provided on the second insulating layer and a second contact portion protruded downward,
    wherein the first contact portion is provided inside the second hole, and the second contact portion is provided inside the first hole and inside the second hole and electrically connected to the active element,
    wherein the second layer is between the first layer and the second insulating layer,
    wherein the common electrode is between the second layer and the second insulating layer, wherein the first contact portion is provided inside the first hole, wherein the second layer includes a third contact portion protruded inward of the first hole, wherein the active element has a semiconductor layer, a third insulating layer is formed on the active element, a scan signal line is formed on the third insulating layer, a fourth insulating layer is formed on the scan signal line, a relay electrode is formed on the fourth insulating layer, wherein the third insulating layer and the fourth insulating layer have a third hole, the relay electrode contacts with the semiconductor layer via the third hole, and wherein the color filter is filled in the third hole.

11. The liquid crystal display device as claimed in claim 10, wherein the pixel electrode faces the common electrode, and does not have a slit.

12. The liquid crystal display device as claimed in claim 10, wherein with a thickness of the color filter assumed to be 1, a thickness of the first insulating layer is within a range of 0.33 to 2.

* * * * *